May 20, 1969   G. H. HUNT   3,445,394
VOLTAGE STABILIZED SOLID POLYOLEFIN DIELECTRIC
Original Filed May 15, 1964

INVENTOR.
GEORGE H. HUNT
BY
McLean and Boustead
ATTORNEYS

United States Patent Office 3,445,394
Patented May 20, 1969

3,445,394
VOLTAGE STABILIZED SOLID POLYOLEFIN DIELECTRIC
George H. Hunt, West Newton, Mass., assignor to Simplex Wire and Cable Company, Cambridge, Mass., a corporation of Massachusetts
Continuation of application Ser. No. 367,718, May 15, 1964. This application June 27, 1967, Ser. No. 649,355
Int. Cl. H01b 3/24, 3/18
U.S. Cl. 252—66                                    31 Claims

ABSTRACT OF THE DISCLOSURE

A dielectric composition is disclosed consisting of a solid phase polyolefin, e.g., polyethylene, having dispersed therein an aromatic hydrocarbon oil containing at least 40 percent of aromatic or naphthenic hydrocarbons and a voltage stabilizing additive. The voltage stabilizing additives include the halogenated polycyclic aromatic compounds and substituted aromatic hydrocarbon compounds characterized by having an electron acceptor group and an electron donor group potentially hydrogen bonded together by a reversibly transferable proton. Suitable electron acceptor groups include —$NO_2$—CO, —CN, phenyl and polycyclic aryl; and suitable electron donor radicals include amino, lower alkyl and fluoro. The voltage stabilizing additive is present in amounts ranging from 5 to 50 parts by weight per 100 parts by weight of aromatic oil, and the total amount of oil and additive present in the polyolefin ranges from 1 to 10 percent by weight based on the polyolefin.

---

Figure 1:
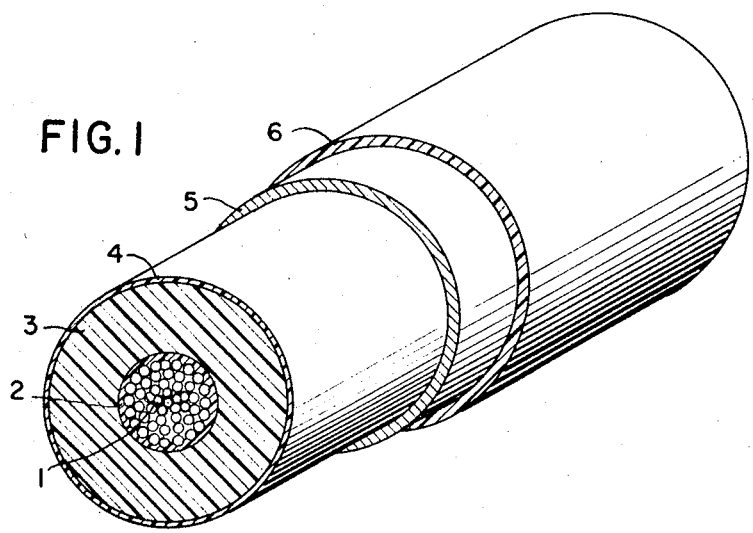

This application is a continuation of application Ser. No. 367,718, filed May 15, 1964, now abandoned.

This invention relates to electric insulating materials of great dielectric strength for use at high voltages, such as on the order of kilovolts, and more particularly to solid polyolefin, e.g., polyethylene, dielectrics of improved voltage stability for use as insulation in power cables.

In the recent past, synthetic high-polymers have found increasing application as insulating materials in various electrical arts. In particular, solid olefin polymers, chiefly polyethylenes, and polypropylene, for example, are generally suitable as insulating materials for electric cables and wires due to their good mechanical properties and workability in conjunction with excellent electrical properties. For high-voltage purposes, however, the use of such substances has been possible only within narrow limits because their theoretical electrical breakdown strength in practice is not even approached.

It has been theorized that the relative weakness of commercially prepared polyolefin insulation results from the many small flaws and air spaces formed during manufacture which are virtually impossible to prevent in commercial manufacturing processes. For example, small particles of foreign matter will always be present in the hydrocarbon matrix. Careful examination of many test failures has now revealed that these small flaws often initiate the growth of a fault in the insulation, with the actual growth of the fault, which results in failure, being due to electron avalanches derived from the current in the cable which produce ionization and subsequent failure at the flaw. A method of reducing the ability of foreign matter to initiate faults, i.e., a method to delay or prevent the occurrence of such electron avalanches, would obviously result in an overall increase in electrical breakdown strength.

A number of additives have been recently found which greatly increase the resistance of polyolefins, such as low density polyethylene, to electrical breakdown. Such additives are described, for example, in copending application Ser. No. 132,584 of Gross and Hunt, filed Aug. 21, 1961, now abandoned, and copending application Ser. No. 372,301, filed June 3, 1964, in the name of Lawrence J. Heidt, which are incorporated herein by reference. These additives, however, are not pure hydrocarbons as is the polyolefin, e.g., polyethylene matrix and, therefore, when added to the polyolefin in large amounts, may undesirably change the dielectric constant and power factor thereof particularly when the desired improvement in voltage stability requires amounts of additive in excess of its solubility since addition of the additive in excess of its solubiilty causes its crystallization in the polyolefin with consequent weakening of the entire structure electrically by creating physical discontinuities.

It has now been surprisingly found, however, that by blending the voltage stabilizing additives exemplified above with a highly aromatic compound which can be blended with the polyolefin, such as nonvolatile hydrocarbon oils, or highly aromatic low melting hydrocarbons as orthoterphenyl and mixed terphenyls, it is possible to achieve excellent voltage stabilization with minimum increase in the dielectric constant or the power factor of the resulting polyolefin, e.g., polyethylene compositions. It is possible, for example, to obtain results equivalent to the use of a much larger (usually at least twice as much) amount of the voltage stabilizing additive without producing a corresponding change in the dielectric constant or power factor. Additionally, in those cases where the active voltage stabilizing additive is of limited solubility in the polymer matrix and, accordingly, cannot be used alone, the stabilizing additive may be dissolved in the aromatic compound to permit the use thereof.

Suitable non-volatile highly aromatic oils for use in the present invention include aromatic oils of petroleum origin having a total aromatic and naphthenic content of at least about 50%, preferably 65%. Several oils suitable for use in the present invention are Kensol PL-1 (Kendall Oil & Refining) which has a specific gravity of 1.038, an aromatic content of greater than 65% and a viscosity of 2.72 cp. (100° C.) and a similar composition, CD-101 (Standard Oil of Ohio), which has a specific gravity of 1.035, a pour point of 20° F., viscosity SUS of 100 at 100° F. and 36 at 210° F., a refractive index of 1.601 and an aniline point of less than 60° F. From this information, it follows that the aromatic content of CD-101 is also greater than 65%. Other suitable oils include Sundex 85 (Sun Oil Company) which has a viscosity in centistokes at 14.4 at 210° F. and a specific gravity of 1.017 and contains about 48% aromatics, 15% naphthenics and 37% parafinics and a Circo Light Oil (Sun Oil Company) which has a viscosity in centistokes of 4.3 at 210° F. and contains 20% aromatics, 40% naphthenics and 40% paraffinics.

Highly aromatic low melting hydrocarbons which may be used in the present invention in place of or in combination with the aromatic oils include, for example, o-terphenyl which has a viscosity of 40.6 at 210° F., SUS, distills in the range of 333° to 350° C., and has a melting point of 56.3° C. The other isomers of terphenyl, m-terphenyl and p-terphenyl distill, respectively in the ranges of 368° to 378° C. and 381° to 388° C., however, the high melting points of these compounds, particularly of p-terphenyl, 212° C., renders these compounds unsuitable for the present invention since they would crystallize out of the polyethylene with consequent weakening of the entire structure electrically by creating physical discontinuities in the polyethylene. Mixed terphenyls are suitable, however. In the latter case, the mixed terphenyls can be blended with an aromatic oil to lower the melting point, preferably to below 70° C., for ease of handling. Additionally, biphenyl, anthracene or phenanthrene can be blended with the aromatic oil or terphenyl to increase the aromatic content thereof and lower the melting point.

Active voltage stabilizing additives which may be incorporated into the highly aromatic compounds to form the blends in accordance with the present invention include polyhalo-polyphenyls of the above noted Gross and Hunt copending application and the additives of the copending Heidt application referred to above. Examples of suitable polyhalo-polyphenyls include chlorinated biphenyls, chlorinated triphenyls and mixtures of the two as well as brominated polyphenyls, e.g., 4,4'-dibromobiphenyl. A variety of polychlorinated polyphenyls, for example, are commercially available as mixtures, including Aroclor 1260 and 1262 (Monsanto Chemical Company) which have, respectively, specific gravities of 1.538 and 1.646, refractive indices of 1.630 and 1.651 and viscosities of 44 and 103 at 210° F. (SV). Other suitable polyhalo compounds include polychlorinated and polybrominated naphthalene and anthracene and mixtures thereof.

The stabilizing additives of the Heidt application referred to above are particularly effective. Such additives include 2,4,6-trinitrotoluene; 2-nitrodiphenylamine; 2,4-dinitrodiphenylamine; o-nitroanisole; 2,6-dinitrotoluene; 2,4-dinitrotoluene; o-nitrobiphenyl; biphenylamine; 2-nitroaniline; anthranilonitrile; 1-fluoro-2-nitrobenzene; mixtures thereof; mixtures thereof with diphenylamine, and mixtures of, for example, diphenylamine with at least one of m-dinitrobenzene m-nitroaniline, p-nitroaniline, m-nitrotoluene, p-nitrotoluene, o-nitrochlorobenzene and p-nitrochlorobenzene. These additives have in common the following features:

(1) An electron acceptor group, especially a strongly unsaturated group, e.g. one containing a bond such as $-NO_2$, $-CO$, $-CN$, phenyl and polycyclic aromatics.

(2) An electron donor group, especially one containing a transferable proton such as amino and lower alkyl groups, e.g., $NH_2$ and $-CH_3$.

(3) Potential hydrogen bonding between the acceptor and donor groups by a transferable proton such as when the acceptor and donor groups are ortho with respect to one another, e.g., on a benzene ring.

(4) Reversibility of the proton transfer between the acceptor and donor groups, such as in the keto-enol isomerization.

(5) Structure and bonds between the acceptor and donor groups which favor transfer of charge and energy such as a planar or near planar structure of a conjugated system of alternating single and double bonds.

6) Adequate size and complexity of the conjugated system to provide for electron capture and subsequent energy dissipation without producing irreversible bond rupture.

(7) Adequate solubility of the additive in the polyolefin insulation material to provide a sufficient number of centers for the capture of objectionable contaminants such as oxygen and of the electrons moving in the electric field.

With respect to requirement (7), above, it will be apparent that the enhanced stabilization achieved utilizing the blends of the present invention lessen the importance of solubility of the stabilizing additive, since smaller amounts can be used to keep the proportion of stabilizing within its soluble limits.

The stabilizing additives of the above noted Gross and Hunt application and of the above noted Heidt application are for the most part solids at normal temperatures and hence must be blended with the polyolefin insulant at elevated temperatures at which the polyolefin is liquid. The inconvenience of such a blending operation can be eliminated with the blends of the present invention as the aromatic oils dissolve the solid stabilizing additives to yield liquid mixtures which can be readily admixed with polyolefin extrusion powder by tumbling or similar techniques.

The additive-oil blends of the present invention are particularly effective with polyolefins such as low density polyethylene base compositions which generally having a density on the order of .92 to .95 and a melt index between 0.2 and 2.0. Specifically, the polyethylenes to which we refer are those solid polymers of ethylene prepared by the "high pressure" process. The blends are also effective as voltage stabilizers in high density (low pressure) polyethylenes and in other polyolefins, e.g. polypropylene. The polyolefin compositions stabilized in accordance with the present invention can, if desired, contain minor amounts of the usual additives, adjuvants and fillers conventionally employed in polyethylene compositions, such as carbon black, pigments, antioxidants, heat stabilizers and oxone resistance stabilizers. The additive-oil blends of the present invention are also useful in increasing the voltage stability of solid polyolefin compositions over a long period of time where the polyolefin compositions contain minor amounts of rubbery polymers and copolymers of such olefins as isobutylene and isoprene. Additionally, the blends can be used with polyethylene compositions which have been cross-linked using for example, a peroxide catalyst, e.g., dicumyl peroxide, 2,5-bis(tertiary-butylperoxy)-2,5-dimethyl hexane, 2,5-dimethyl-2,5 - di(tertiary-butylperoxy)hexane-3, etc., or irradiation on the order of 10 to 15 megarads with cobalt 60 or a linear accelerator, or the like.

A variety of proportions can be used in preparing the blends of the highly aromatic compound, i.e., nonvolatile aromatic oil or aromatic hydrocarbon, and the voltage stabilizing additive. Since the oils, per se, also exhibit some voltage stabilizing properties in polyolefins, the proportions chosen are likely to be those which are the most economically attractive, although it will be appreciated other considerations, e.g., effectiveness can also affect the choice of proportions. As little as 5 parts by weight, and up to 40 to 50 parts, of a stabilizing additive such as 2,4-dinitrotoluene or polychloropolyphenyl in 100 parts by weight of aromatic oil or orthoterphenyl can be used. 25 parts of the active stabilizing additive per 100 parts of the aromatic oil or hydrocarbon is a convenient and effective blend.

The blend of highly aromatic hydrocarbons and voltage stabilizing additive is used in the polyolefin, e.g., polyethylene in an amount effective to act as a voltage stabilizer. Such amounts are, for example, from about 1 to 10%, preferably 2 to 5%, by weight based on the amount of polyolefin. Where copious blooming or bleeding of the aromatic oil out of the polyolefin is objectionable, the upper limit for the amount of aromatic oil in the polyolefin, e.g., polyethylene, is about 8% by weight, preferably 5 to 6%, since a heavy bleeding may occur at about 8% by weight.

In practice, it is frequently desirable to apply a semiconducting shield over a stranded conductor, e.g., of copper, in order to decrease the possibility of an electrical discharge in voids between the conductor and the inner surface of overlying insulation with resulting deterioration of the dielectric. The shield, known as a strand shield, typically is an extruded coating of a semiconducting polyolefin material, e.g., polyethylene containing small amounts of conduction material such as carbon black. Solid polyolefins are also employed as cable jackets, in which case they are frequently compounded with carbon black or other pigments.

In accordance with the present invention, a considerable improvement in the electrical breakdown strength of a polyethylene insulated high voltage cable can also be obtained by adding a proportion of the additive-oil blends described above to the strand shield, or other semiconducting layer, when used, and to the cable jacket, if it is polyolefin based. Because the strand shields are in the zone of greatest hazard of imperfection, however, a larger amount of stabilizer is used than is used in the insulation. About 2 to 20% by weight of additive-oil blend, particularly about 10%, has been found suitable for use with a semiconductive strand shield composition.

A typical strand shield can be formed using the same polyolefin material used for the overlying insulation, or a similar extrudable material, which contains a material, e.g., carbon black, which renders it semiconductive. A strand shield composition can, for example, be formed of a polyethylene-acrylate copolymer containing 30 to 40 parts of semiconducting carbon blacks per 100 parts by weight of copolymer which gives a resistivity of about 100 ohm-cm. A weatherproof jacket for a cable can also be the same polyolefin base material used for insulation or, if desired, any other weatherproof material which may be easily applied to the cable. A typical weatherproof black material is formed by incorporating into polyethylene, e.g., having a density of 0.92 and a melt index of 0.3, about 2½ to 3 parts of a well-dispersed finely divided carbon having an average size of 10–20 mu per 100 parts by weight of polyethylene.

Figure 2:
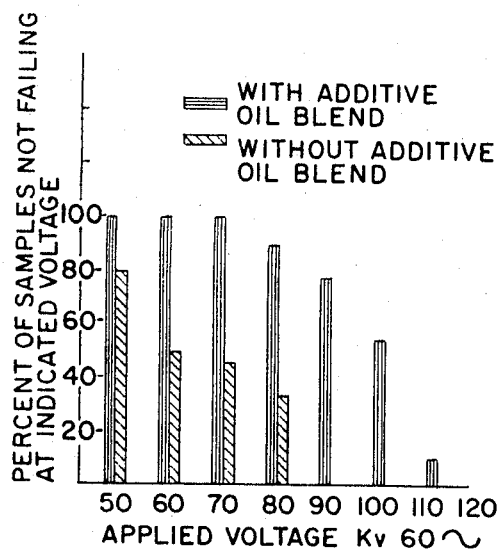
Figure 3:
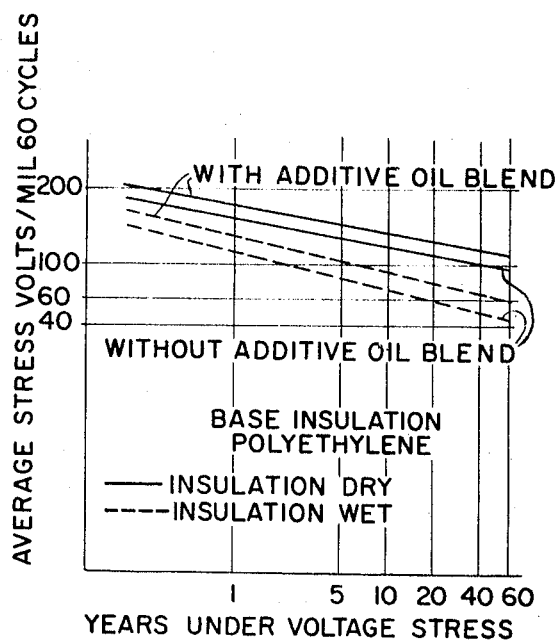

Referring now to the drawings and the examples hereinbelow which serve to further illustrate the invention without limiting the same, FIGURE 1 shows a typical cable construction;

FIGURE 2 is a graph showing the ability of polyethylene with and without additives to withstand A-C 60 cycle voltages; and FIGURE 3 is a graph showing the expected A-C voltage life of polyethylene with and without additives.

EXAMPLE 1

To illustrate the effectiveness of the additive-oil blends in accordance with the present invention, and referring to FIGURE 1, a cable was constructed using a 61 strand, bare copper conductor 1 (350,000 circular rails) by applying an extruded semiconducting polyethylene strand shield 2 over the conductor. Insulation 3 which is extruded over strand shield 2 comprises a 0.620 in. wall of polyethylene (0.92 density, 0.3 melt index) containing a trace of an antioxidant and 2.5 parts per 100 parts by weight polyethylene of a blend of 25 parts by weight of Aroclor 1260 and 100 parts by weight of Kensol PL-1, described above. A shield 4 is applied over insulation 3 by helically serving (a) semiconducting nylon tapes and (b) 0.004 in. thick copper tape over insulation 3. A protective coating 5 of 0.100 in. wall thickness of lead, and a 0.095 in. wall thickness of a high molecular polyethylene, weatherproof black jacket, such as described above, are respectively extruded over insulation 3. The resultant cable, which had an approximate outside diameter of 2.5 inches and weighed 6570 pounds per 1000 feet, was suitable for 69 kv. grounded neutral (40 kv. to ground) service at a rating of 45,000 kva. (100% L.F.).

The greater ability of polyethylene with additives to withstand A-C voltage, as compared to the same type of polyethylene without additives, is shown in FIGURE 2. In this case a number of samples were prepared of #12 AWG solid copper wire having an extruded insulation of low density, solid polyethylene with a 0.080 inch wall thickness. In one case the polyethylene contained 2.5 parts by weight per 100 parts of polyethylene of the blend of 25 parts by weight of Aroclor 1260-Kensol PL-1; while in the other case the samples were prepared using identical polyethylene except the Aroclor 1260-Kensol PL-1 blend was omitted. All of the samples were tested under identical conditions, initially at 50 kv. (60 cycle), and then every five minutes the applied voltage was raised by a 5 kv. increment. FIGURE 2 illustrates the percentage of samples not failing the test (omitting every other test voltage). As can be seen the inclusion of the additive-oil blend provides for greater voltage stability than is obtained without the blend. Thus, for example, one hundred percent of the polyethylene samples with the additive-oil blend withstood 70 kv., whereas more than 50 percent of the samples without the additives failed.

The improved A-C dielectric strength attributable to the additive-oil blend is also shown by tests, the results of which are shown in Table I, on cables insulated with a 0.220 in. wall of polyethylene (.92 specific gravity, .3 melt index), in one case containing 2.5 parts by weight per 100 parts of polyethylene of the above noted Aroclor 1260, Kensol PL-1 blend, and in the other case omitting the blend. The cables were dry at room temperature and the 60 cycle applied voltage was raised in 10 kv. steps at 15 minute intervals.

TABLE I (Without Additives—Oil Blend)

Time to Failure at

| Voltage: | Indicated Voltage (min.) |
|---|---|
| 98 | 1 |
| 63 | 1.5 |

(With Additive—Oil Blend)

Time to Failure at

| Voltage: | Indicated Voltage (min.) |
|---|---|
| 107 | 58 |
| 106[1] | 14 |
| Plus 97 | 144 |

[1] Test equipment difficulties required voltage to be decreased.

Other tests have indicated that the A-C dielectric strength of these samples in water, as compared to dry tests, is approximately 92 percent for the polyethylene containing the additive-oil blend.

Table II shows the capability of polyethylene, when in a dry environment to withstand relatively high D-C voltage stresses for a period of time is augmented by the use of the voltage stabilizing additive-oil blend. The samples tested were No. 9 AWG solid copper with a 0.100 in. wall of polyethylene and 4 samples per test were used.

TABLE II.—HOURS TO FAILURE (LOG MEAN) VOLTAGE STRESS=700 VOLTS PER MIL

| Type of insulation (polyethylene): | Sample-dry Room temp. |
|---|---|
| Without additive-oil blend | 7,700 |
| With additive-oil blend | [1]12,000 |

[1] Three out of four samples still on test at time of collating data.

The addition of the additive-oil blend of the invention does not appear to increase the impulse dielectric strength of polyethylene. However, the high impulse dielectric strength of the polyethylene insulation is attested to by the ability of the 69 kv. polyethylene cable described above with 0.620 in. wall of insulation to withstand 1000 kv. 1½ × 40 negative impulse voltage. The basic impulse insulation level for the 69 kv. cable is 350 kv.

Additionally, the polyethylene insulated cable, with and without the additive-oil blend, was tested in accordance with the single needle test (AIEE Transaction Paper No. 62-54, "An Accelerated Screening Test for Polyethylene High-Voltage Insulation," D. W. Kitchin and O. S. Pratt). In this test a "standard defect" is used to determine the relative dielectric strength and to indicate the probable voltage life of the polyethylene insulation by inspection for "treeing," a characteristic generally accepted as an early stage of dielectric breakdown. The "standard defect" consists of a needle imbedded in a sample of polyethylene under controlled conditions. The sample is then stressed by applying a voltage between the needle and a remote ground. It is then inspected by a microscope for detectable "trees." The voltage at which 4 out of 8 duplicate samples develop "trees" in one hour is the "one-hour characteristic voltage."

The needle test has shown to correlate well with the results of voltage life tests on wires. This is true of polyethylene with voltage stabilizing additives, as well as conventional polyethylene formulations. Typical results are given in Table III. As in Table II, the polyethylene was low density polyethylene (.92 specific gravity, .3 melt index) and where the additive-oil blend was used, it was 2.5 parts by weight per 100 parts by weight of polyethylene of a blend of 25 parts of Aroclor 1260 in 100 parts of Kensol PL-1.

TABLE III

| Type of Insulation | Voltage Life [1] | Single Needle Test [2] |
|---|---|---|
| Polyethylene: | | |
| Without additive oil blend | 930 | 23 |
| With additive oil blend | 2,900 | 46 |

[1] (a) Wire in water at room temp. (b) Volts per mil=230. Time to failure, hours.
[2] One hour characteristic voltage, kv.

Estimated A-C voltage life of polyethylene insulations are shown in FIGURE 3. These curves predict the voltage life to be expected of commercial lengths of cable and are based on extrapolations of existing data for life at relatively high stress (greater than 200 volts/mil) and exposures of up to 3000 hours. The same polyethylene composition, additive-oil blend and proportions were used as in Tables II and III. In extrapolating, it is assumed that the slope of the curve for the polyethylene formulation with the additive-oil blend is no flatter than that for the regular polyethylene formulation.

EXAMPLE II

The following Table IV illustrates test results using the single needle method with other polyethylene compositions in accordance with the invention.

TABLE IV

| Polyethylene | Additive | Percent Additive | Characteristic Voltage | Av. volts per min. at Failure, 15 min. step rise on an 80 mil wall on solid copper |
|---|---|---|---|---|
| 0.2 melt index, density 0.92 | {Kensol PL-1 / Aroclor 1260} | 2 / 1/2 | 46 | |
| Do | {CD-101 / Aroclor 1260} | 2 / 1/2 | >40 | |
| 0.3 melt index, density 0.92 | {Kensol PL-1 / Diphenylamine} | 2 / 1/2 | >60 | 864 |
| Do | {Kensol PL-1 / 2,4-dinitrotoluene} | 2 / 1/2 | >60 | 896 |

The following table illustrates a number of examples of polyolefin compositions in accordance with this invention which contain mixtures of aromatic hydrocarbon oils and voltage stabilizers, which compositions exhibit superior dielectric properties. In general the compositions are prepared by blending the oil and stabilizer in the prescribed proportions. Then the blend is added in the prescribed amount to a tumbling bin into which the polyolefin has previously been introduced. The polyolefin is granular and absorbs the blend upon tumbling. Subsequently the tumbled composition is shaped by extrusion to form wire insulation. The tumbled compositions can also be injection molded or formed by other techniques involving application of heat and pressure. In each example below 100 parts by weight of polyolefin are used and the polyolefin is a low density polyethylene having a specific gravity of 0.92 and a melt index of 0.2, and includes about 0.1% by weight of p-phenylenediamine as an antioxidant. In preparing these blends of other additives in aromatic oil, I have found it advantageous to warm the mixtures. A temperature of 70 to 80° C. is sufficient to increase the speed and ease of blending.

| Example No. | Polyolefin | Amount of Blend of parts by weight | Oil | Additive | Wt. ratio of additive and oil |
|---|---|---|---|---|---|
| III | Polyethylene A | 2 | CD-101 | 4,4'-dibromobiphenyl | 10:100 |
| IV | do | 2 | o-Terphenyl | 9,10'-dibromoanthracene | 5:100 |
| V | do | 1 | Mixed terphenyls | 4 bromobiphenyl | 5:100 |
| VI | do | 1 | Sundex 85 | 4-iodobiphenyl | 20:100 |
| VII | do | 4 | Circo Light Oil | Diphenylamine | 40:100 |
| VIII | do | 10 | CD-101 | 2,4,6-trinitrotoluene | 5:100 |
| IX | do | 10 | CD-101 | 2-nitro diphenylamine | 50:100 |
| XI | do | 6 | Kensol PL-1 | o-Nitroanisole | 20:100 |
| XII | do | 8 | o-Terphenyl | 2,6-dinitrotoluene | 10:100 |
| XIII | do | 2½ | Circo Light Oil +10% by weight of biphenyl | 2,4-dinitrotoluene (tech.) | 25:100 |
| XIV | do | 5 | CD-101 +20% by weight of anthracene | Nitrodiphenylamine | 40:100 |
| XV | do | 8 | Kensol PL-1+5% by weight of phenanthrene | 2-nitroaniline | 10:100 |
| XVI | do | 2½ | CD-101 | Anthranilonitrile | 25:100 |
| XVII | do | 5 | CD-101 | 2,6-dinitroaniline | 25:100 |
| XVIII | do | 2½ | CD-101 | 1-fluoro-2-nitrobenzene | 25:100 |
| XIX | do | 1 | CD-101 | Equimolar mixtures of diphenylamine and m-dinitrobenzene | 25:100 |
| XXII | do | 10 | Kensol PL-1 | Equimolar mixtures of diphenylamine and m-nitrotoluene | 5:100 |
| XXIII | do | 5 | Circo Light Oil +5% by weight naphthalene | Equimolar mixtures of diphenylamine and p-nitrotoluene | 40:100 |
| XXIV | do | 3 | CD-101 | Equimolar mixtures of diphenylamine and o-nitrochlorobenzene | 10:100 |
| XXV | do | 10 | o-Terphenyl | Equimolar mixtures of diphenylamine and p-nitrochlorobenzene | 20:100 |
| XVI | do | 2½ | CD-101 | Phenyl alpha naphthylamine | 25:100 |
| XXVII | do | 2½ | CD-101 | Phenyl beta naphthylamine | 25:100 |
| XXVIII | do | 2½ | CD-101 | N-N'diphenyl paraphenylene diamine | 25:100 |
| XXIX | do | 2½ | CD-101 | Diparamethyoxydiphenylamine | 25:100 |

EXAMPLE XXX

A composition of polyethylene (0.92 density, 0.3 melt index) containing 2½% by weight of carbon black and 2½% by weight of a blend containing 100 parts by weight of Kensol PL-1 and 25 parts by weight of Aroclor 1260 exhibits excellent voltage stability as follows:

15 min. step breakdown test starting at 30 kv. and rising by 10 kv. steps. Voltage is held constant for 15 minutes at each step.

|  | With additive-oil blend | Without additive-oil blend |
|---|---|---|
| Max. Voltage, kv | 80 | 50 |
| Min., kv | 60 | 40 |
| Mean, kv | 68 | 48 |
| Volts/mil/hr | 483 | 342 |

EXAMPLE XXXI

When the polyethylene composition is cross-linked with a peroxide catalyst after blending as in Example XXX the results are as follows:

|  | With additive-oil blend | Without additive-oil blend |
|---|---|---|
| Max. Voltage, kv | 70 | 60 |
| Min., kv | 40 | 40 |
| Mean, kv | 62 | 50 |
| Volts/mil/hr | 433 | 348 |

EXAMPLE XXXII

The blends of Example XXX exhibit excellent voltage stabilizing results with a strand shielding having a resistivity of about 100Ω-cm. comprising polyethyleneacrylate copolymer containing 30 to 40 parts by weight of semiconducting carbon black per 100 parts by weight of copolymer when using about 10 parts of the additive-oil blend per 100 parts of the copolymer.

Although throughout the preceding description reference has been made to the aromatic oil and stabilizing additive as a blend, since normally it is convenient to premix these components and add them to the polyolefin just prior to extrusion or other shaping operation, it will nevertheless be appreciated that each can be separately added to the polyolefin.

It is claimed:

1. A dielectric composition consisting essentially of a solid phase polyolefin having dispersed therein, an aromatic hydrocarbon oil containing at least 40% of cyclic hydrocarbons selected from the group consisting of aromatic and naphthenic hydrocarbons, and a voltage stabilizing additive selected from the group consisting of halogenated polycyclic aromatic compounds and of substituted aromatic hydrocarbon compounds characterized by having an electron acceptor group and electron donor group potentially hydrogen bonded together by a reversibly transferable proton, said electron acceptor being a radical selected from the group consisting of —$NO_2$, —CO, —CN, phenyl and polycyclic aryl and said electron donor being a radical selected from the group consisting of amino, lower alkyl and fluoro, said additive being present in a proportion from about 5 to 50 parts by weight per 100 parts by weight of said oil, and the total amount of said oil and additive being present in a proportion of about 1 to 10% by weight based on the polyolefin.

2. A dielectric composition according to claim 1 in which said polyolefin is polyethylene.

3. The composition of claim 2 wherein said stabilizing additive is a said substituted aromatic hydrocarbon compound which is further characterized by having said electron donor group and said electron acceptor group ortho position on an aromatic ring thereof.

4. The composition of claim 2 wherein said stabilizing additive is a said substituted aromatic compound which is further characterized by having said acceptor and donor groups on different but adjacent aromatic hydrocarbon molecules.

5. A composition according to claim 2 in which said stabilizing additive is a mixture of polychlorinated biphenyls.

6. A composition according to claim 2 in which said stabilizing additive is 4,4′-dibromobiphenyl.

7. A composition according to claim 2 in which said stabilizing additive is 9,10′-dibromoanthracene.

8. A composition according to claim 2 in which said stabilizing additive is 4-bromobiphenyl.

9. A composition according to claim 2 in which said stabilizing additive is 4-iodobiphenyl.

10. A composition according to claim 2 in which said stabilizing additive is diphenylamine.

11. A composition according to claim 2 in which said stabilizing additive is 2,4,6-trinitrotoluene.

12. A composition according to claim 2 in which said stabilizing additive is 2-nitrodiphenylamine.

13. A composition according to claim 2 in which said stabilizing additive is 2,4-dinitrodiphenylamine.

14. A composition according to claim 2 in which said stabilizing additive is o-nitroanisole.

15. A composition according to claim 2 in which said stabilizing additive is 2,6-dinitrotoluene.

16. A composition according to claim 2 in which said stabilizing additive is 2,4-dinitrotoluene.

17. A composition according to claim 2 in which said stabilizing additive is o-nitrodiphenylamine.

18. A composition according to claim 2 in which said stabilizing additive is 2-nitroaniline.

19. A composition according to claim 2 in which said stabilizing additive is anthranilonitrile.

20. A composition according to claim 2 in which said stabilizing additive is 2,6-dinitroaniline.

21. A composition according to claim 2 in which said stabilizing additive is 1-fluoro-2-nitrobenzene.

22. A composition according to claim 2 in which said stabilizing additive is a mixture of diphenylamine and an aromatic compound selected from the group consisting of m-dinitrobenzene, m-nitroaniline, p-nitroaniline, m-nitrotoluene, para-nitrotoluene, o-nitrochlorobenzene and p-nitrochlorobenzene.

23. A composition according to claim 2 in which said stabilizing additive is phenyl-alpha-naphthylamine.

24. A composition according to claim 2 in which said stabilizing additive is phenyl-beta-naphthylamine.

25. A composition according to claim 2 in which said stabilizing additive is N,N′-diphenylparaphenylenediamine.

26. A composition according to claim 2 in which said stabilizing additive is diparamethoxydiphenylamine.

27. A composition according to claim 2 in which said stabilizing additive is o-nitrobiphenyl.

28. A composition according to claim 10 in which said stabilizing additive further includes a compound selected from the group consisting of 2,4,6-trinitrotoluene, 2-nitrodiphenylamine, 2,4-dinitrotoluene and o-nitrobiphenyl.

29. A composition of matter which consists essentially of an aromatic hydrocarbon oil containing at least 40% of cyclic hydrocarbons selected from the group consisting of aromatic and naphthenic hydrocarbons, and a voltage stabilizing additive selected from the group consisting of halogenated polycyclic aromatic compounds and substituted aromatic hydrocarbon compounds characterized by having an electron acceptor group and electron donor group potentially hydrogen bonded together by a reversibly transferable proton, said electron acceptor being a radical selected from the group consisting of —$NO_2$, —CO, —CN, phenyl and polycyclic aryl and said electron donor being a radical selected from the group consisting of amino, lower alkyl and fluoro, said additive being present in a proportion of from about 5 to 50 parts by weight per 100 parts by weight of said oil.

30. A composition according to claim 29 in which said stabilizing additive is a mixture of diphenylamine and an aromatic compound selected from a group consisting of 2,4,6-trinitrotoluene, 2-nitrodiphenylamine, 2,4-dinitrotoluene, and o-nitrobiphenyl.

31. A composition according to claim 29 in which said stabilizing additive is a mixture of polychlorinated biphenyls.

References Cited

UNITED STATES PATENTS

| | | | |
|---|---|---|---|
| 2,818,422 | 12/1957 | Heininger | 252—63.7 |
| 2,977,516 | 3/1961 | Weingarten | 252—66 |
| 3,075,040 | 1/1963 | Lemmerich et al. | 252—63 XR |

LEON D. RODSOL, *Primary Examiner.*

J. D. WELSH, *Assistant Examiner.*

U.S. Cl. X.R.

174—110; 252—63.7; 260—33.6, 41